United States Patent [19]

Carette et al.

[11] Patent Number: 5,194,470
[45] Date of Patent: Mar. 16, 1993

[54] COMPOSITIONS FOR STABILIZING CHLORINATED POLYMERS

[75] Inventors: Louis Carette, Issy les Moulineaux; Michel Gay, Villeurbanne; Gerard Velleret, Paris, all of France

[73] Assignee: Rhone-Poulenc Chimie, Cedex, France

[21] Appl. No.: 687,953

[22] Filed: Apr. 19, 1991

[30] Foreign Application Priority Data

Apr. 20, 1990 [FR] France .................... 90 05296

[51] Int. Cl.$^5$ ............... C08K 5/57; C08K 3/34; C09K 15/32
[52] U.S. Cl. .................... 524/178; 524/265; 524/267; 524/399; 524/400; 524/450; 252/400.31; 252/400.52; 252/400.53
[58] Field of Search ............. 524/443, 178, 175, 265, 524/267, 399, 400, 450; 252/400.52, 400.53, 400.31

[56] References Cited

U.S. PATENT DOCUMENTS

| | | | |
|---|---|---|---|
| 3,869,420 | 3/1975 | Mathis et al. | 524/143 |
| 4,083,789 | 4/1978 | Morgan et al. | 524/127 |
| 4,102,839 | 7/1978 | Crochemore et al. | 524/396 |
| 4,221,687 | 9/1980 | Minagawa et al. | 524/400 |
| 4,751,261 | 6/1988 | Miyata et al. | 524/181 |
| 4,808,649 | 2/1989 | Gay et al. | 524/425 |

FOREIGN PATENT DOCUMENTS 0040286 11/1981 European Pat. Off.
0225261  6/1987 European Pat. Off.

*Primary Examiner*—Paul R. Michl
*Assistant Examiner*—Tae H. Yoon
*Attorney, Agent, or Firm*—Finnegan, Henderson, Farabow, Garrett and Dunner

[57] ABSTRACT

Novel compositions for stabilizing chlorinated polymers, copolymers and homopolymers comprising dawsonite, an organotin β-diketonate, an organic zinc compound, and an organic calcium, magnesium, barium or lanthanide compound are disclosed. The compositions of the present invention enable the content of epoxidized oils to be decreased in chlorinated polymers while preserving thermal stability.

20 Claims, No Drawings

COMPOSITIONS FOR STABILIZING CHLORINATED POLYMERS

FIELD OF THE INVENTION

The present invention relates to novel compositions, and more specifically, relates to novel compositions for stabilizing chlorinated polymers.

BACKGROUND OF THE INVENTION

Depending on the applications envisaged, thermal stabilization during shaping or during the use of the corresponding products is carried out in various ways.

French Patent FR-A-2,297,227 describes PVC compositions stabilized effectively by metal-organic salts such as salts of zinc, calcium and barium and β-diketones.

These compositions also contain common additives such as epoxidized oils, lubricants, plasticizers or impact strength enhancing agents.

For some applications, especially those for which the chlorinated polymer has to be plasticized to only a small extent, if at all, the customary presence of relatively large amounts of epoxidized oil, such as epoxidized soybean oil or epoxidized linseed oil, in the polymer, tends to lower the softening point of the polymer.

In fact, the elimination or a significant decrease in the content of these epoxidized oils tends to decrease the thermal stability of the polymer compositions.

This manifests itself, during thermo-forming of the compositions, in a substantial yellowing of the polymer, which is unacceptable for applications requiring transparency and a colorless or only slightly colored appearance of the shaped article, for example, in the case of PVC containers.

SUMMARY OF THE INVENTION

One object of the present invention is directed towards a solution to the above-described problem, thus enabling the content of epoxidized oils to be decreased while preserving the thermal stability of polymer compositions.

Additional objects and advantages of the present invention will be set forth in part in the description which follows, and in part will be obvious from the description, or may be learned by practice of the present invention. The objects and advantages of the present invention will be realized and attained by means of the elements and combinations particularly pointed out in the appended claims.

To achieve the objects and in accordance with the purpose of the present invention, as embodied and broadly described herein, the present invention is directed to a composition for stabilizing a chlorinated polymer comprising:
a) an effective amount of dawsonite,
b) an effective amount of organotin β-diketonate,
c) an effective amount of organic zinc compound, and
d) an effective amount of organic calcium, magnesium, barium or lanthanide compound or a mixture thereof.

The present invention is also directed to a stabilized composition comprising:
a) a chlorinated polymer,
b) an effective amount of dawsonite,
c) an effective amount of organotin β-diketonate,
d) an effective amount of organic zinc compound, and
e) an effective amount of organic calcium, magnesium, barium or lanthanide compound or a mixture thereof.

It is to be understood that both the foregoing general description and the following detailed description are exemplary and explanatory only and are not restrictive of the invention, as claimed.

DETAILED DESCRIPTION OF THE INVENTION

Generally, any chlorinated polymers can be used with the present invention, for example, polyvinyl chloride (PVC) and polyvinylidene chloride. In addition, copolymers predominantly containing vinyl chloride units obtained from vinyl chloride and other monomers and mixtures of polymers or copolymers of which a predominant part is obtained from vinyl chloride can also be used.

Any type of PVC is suitable, irrespective of its method of preparation, namely bulk, suspension or dispersion polymerization or any other type of polymerization, and irrespective of its intrinsic viscosity.

The vinyl chloride homopolymers may also be chemically modified, for example, by chlorination.

Many vinyl chloride copolymers may also be stabilized against the effects of heat, e.g., yellowing and degradation, by the compositions of the present invention. In particular, the copolymers obtained by copolymerization of vinyl chloride with other monomers possessing a polymerizable ethylenic bond, for example, vinyl acetate or vinylidene chloride; maleic or fumaric acid or their esters; olefins such as ethylene, propylene, hexene; acrylic or methacrylic esters; styrene; and vinyl ethers such as vinyl dodecyl ether can be stabilized by the compositions of the present invention.

Customarily, these copolymers contain at least 50% by weight of vinyl chloride units and preferably at least 80% by weight of vinyl chloride units.

The compositions according to the present invention can also be used with chlorinated polymers which contain minor amounts of other polymers, such as halogenated polyolefins or acrylonitrile/butadiene/styrene copolymers.

PVC alone or mixed with other polymers is the chlorinated polymer most widely used in the compositions of the present invention.

The term, organotin β-diketonate, encompasses diorganotin derivatives of aromatic, arylaliphatic, aliphatic and cyclic β-diketones, poly(β-diketones) and also β-keto aldehydes.

They are, preferably, dialkyltin IV β-diketonates, the 2 alkyl radicals, which may be the same or different, being linear or branched and having from 1 to 12 carbon atoms.

Dialkyltin IV derivatives of the β-diketo compounds can also be used. Examples are described in French Patents or Certificates of Additions FR-A-2,292,227, FR-A-2,324,681, FR-A-2,351,149, FR-A-2,352,025, FR-A-2,383,988 and FR-A-2,456,132 and in European Patents EP 0,040,286 and EP 0,046,161.

Examples of dialkyltin IV β-diketonates include, but are not limited to, dimethyltin IV, dibutyltin IV and dioctyltin IV derivatives of benzoylstearoylmethane, dibenzoylmethane, benzoylacetone, benzoyl-(3-methylbutanoyl)methane, (methoxycarbonylbenzoyl)benzoylmethanes and bis(β-diketones) such as 1,4-bis-(acetoacetyl)butane, 1,8-bis(benzoylacetyl)octane and 1,4-bis(acetoacetyl)benzene.

It is also possible to use an organotin β-diketonate in combination with a free β-diketone, such as those from which the organotin β-diketonates described above are derived. In practice, this can be a free β-diketone corresponding to the organotin β-diketonate used.

In general, the compositions according to the present invention contain from 0.005% to 5% by weight of organotin β-diketonate, which may contain free β-diketone, relative to the weight of the chlorinated polymer used, and preferably from 0.01% to 2% weight/weight.

Any organic zinc compounds can be used in the present invention. Zinc carboxylates and phenolates are preferred.

The zinc salts of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic and salicylic acids; and the zinc phenolates of phenol and of phenols substituted with one or more alkyl radicals, such as nonylphenols are common examples.

On practical grounds or on economic grounds, zinc propionate, zinc 2-ethylhexanoate, zinc laurate, zinc stearate, zinc oleate, zinc ricinoleate, zinc benzoate, zinc para-tert-butylbenzoate, zinc salicylate, zinc mono(2-ethylhexyl) maleate and zinc nonylphenates are more preferred among the organic zinc compounds mentioned above.

In general, the organic zinc compounds are present in the amount of from 0.005% to 1% by weight relative to the chlorinated polymer, and preferably from 0.01% to 0.6% by weight.

Any organic calcium, magnesium, barium and lanthanide compound or a mixture thereof may be used, but preferably the carboxylates and phenolates of these metals are used.

Most commonly used are, for example, the calcium, magnesium, barium and lanthanide salts of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic and salicylic acids; and the calcium, magnesium, barium and lanthanide phenolates of phenol and of phenols substituted with one or more alkyl radicals, such as nonylphenols.

On practical grounds or on economic grounds, the salts of propionic, 2-ethylhexanoic, lauric, stearic, oleic, ricinoleic, benzoic, para-tert-butylbenzoic and salicylic acids and the mono(2-ethylhexyl) maleates are more preferred among the organic calcium, magnesium, barium and lanthanide compounds mentioned above, as are the nonylphenates of these metals.

In general, the organic calcium, magnesium, barium and lanthanide compound or mixture thereof is present in the amount of from 0.005% to 5% by weight relative to the weight of the chlorinated polymer, and preferably from 0.02% to 2% by weight.

For applications involving foodstuffs, and in particular for the manufacture of PVC bottles, organic calcium compounds or mixtures of the organic calcium compounds and organic magnesium compounds are used.

Dawsonite is a basic aluminum sodium carbonate. It is a monoclinic crystalline carbonate generally represented by the formula $NaAl(OH)_2CO_3$, with this representation not necessarily being the only one possible.

Reference may be made to general works on inorganic chemistry, such as, for example, the "NOUVEAU TRAITE DE CHIMIE MINERALE, TOME II" (New Treatise on Inorganic Chemistry) by P. PASCAL.

In general, the compositions according to the present invention contain from 0.005% to 5% by weight of dawsonite relative to the weight of the chlorinated polymer, and preferably from 0.01% to 2% by weight.

The compositions according to the present invention display a thermal stability, in particular, during their shaping, essentially equivalent to similar compositions containing larger amounts of epoxidized soybean oil, as well as a similar lubricant nature, whereas they possess a higher viscosity number.

It is also possible to introduce other additives into the compositions based on the chlorinated polymer used in the present invention.

Thus, for example, it is possible to add a (γ-hydroxyalkyl)polyorganosiloxane oil of general formula (I)

$$(R)_3Si-\left[O-\underset{\underset{OH}{R'}}{\underset{|}{Si}}\right]_p\left[O-\underset{\underset{R}{|}}{\underset{|}{Si}}\right]_q-OSi(R)_3 \quad (I)$$

wherein,

R, which may be the same or different, represent a methyl or phenyl radical, with at least 60 mol % of R being methyl radicals, R' represents a linear or branched alkylene radical having 2 to 6 carbon atoms, p represents an average number from 1 to 30, and q represents an average number from 1 to 100.

(The term "average" is used because the polyorganosiloxanic oils are polymer compounds with different molecular weights and different numbers of units statistically distributed along the polymeric chain, and thus p and q are an average number between the numbers and units in the different polymeric compounds.)

Among polyorganosiloxane oils, preference is given in the present invention to the oils of formula (I) in which:

R represents a methyl radical;

R' represents a trimethylene or 2-methyltrimethylene radical;

p represents an average number from 2 to 20; and q represents an average number from 2 to 30.

In general, the polyorganosiloxane oils are present in the amount of from 0.005% to 5% by weight relative to the weight of the chlorinated polymer, and preferably from 0.01% to 2% by weight.

The compositions of the present invention can also contain other secondary thermal stabilizers such as polyols and phosphites.

Polyols generally have the advantage of prolonging the life of the chlorinated polymers subjected to a heat treatment.

In general, it is preferable that the polyols used have a boiling point above 150° C., and more preferably above 170° C., on account of the high-temperature processing of chlorinated polymers.

Examples of such polyols include, but are not limited to, triols such as trimethylolpropane, glycerol, 1,2,6-hexanetriol, 1,2,4-butanetriol, tris(hydroxyethyl)isocyanurate; tetrols such as pentaerythritol, diglycerol; pentitols such as xylitol, tetramethylolcyclohexanol; hexitols such as mannitol, sorbitol, dipentaerythritol; polyols partially esterified with a carboxylic acid, and in formulas of which at least 3 hydroxyl functions are free; and polyvinyl alcohols, in particular those in which there remains less than 30 mol % of ester groups relative to their total content of ester and hydroxyl groups.

Among these polyols, xylitol, mannitol, sorbitol, tetramethylolcyclohexanol and the polyvinyl alcohols defined above are more preferred.

Polyols, when used, are present in the compositions according to the present invention from 0.005% to 1% by weight of polyol relative to the chlorinated polymer, and preferably from 0.01% to 0.6% by weight.

The compositions according to the present invention can also contain organic phosphites, in particular, aliphatic phosphites or aromatic phosphites or mixed aliphatic and aromatic phosphites.

When present, the phosphite is used in an amount of from 0.05% to 5% by weight relative to the chlorinated polymer, and preferably from 0.1% to 2% by weight.

The compositions according to the present invention can also contain customary additives such as phenolic antioxidants and UV protecting agents such as benzophenones, benzotriazoles or sterically hindered amines (usually known by the term HALS).

The compositions of the present invention can also contain epoxides, in particular, epoxidized polyglycerides such as epoxidized soybean oil, epoxidized linseed oil, epoxidized fish oils or epoxidized tall oil.

plasticized formulations, such as for the manufacture of films for agricultural use.

Usually, the incorporation of the various stabilizers or additives is carried out when the chlorinated polymer is in the powder state.

It is possible to prepare a mixture of various compositions of the present invention before their incorporation into the chlorinated polymer.

All of the conventional methods of incorporation of the compositions of the present invention, stabilizers and/or additives into the polymer may be used. For example, the homogenization of the polymer composition may be carried out on a roller mixer or mill, at a temperature such that the composition becomes fluid, for example, normally between 150° C. and 200° C. for PVC, and for a sufficient time, of the order of a few minutes to perhaps 20–30 minutes or more.

The compositions of the present invention including chlorinated polymer, and more especially including PVC, may be processed according to all the customarily used techniques, such as, for example, extrusion, injection, extrusion blow molding, calendering or rotational molding.

The present invention will be further clarified by the following examples, which are intended to be purely exemplary of the invention.

EXAMPLE 1

The formulations A, B, C, D, E and E' (comparative test) detailed in Table I below were prepared.

TABLE I

| COMPOUND | Composition A | Composition B | Composition C | Composition D | Composition E | Composition E' |
|---|---|---|---|---|---|---|
| PVC suspension SO 91 (*) | 100 g | 100 g | 100 g | 100 g | 100 g | 100 g |
| Impact strength enhancing agent (KM 334**) | 7 g | 7 g | 7 g | 7 g | 7 g | 7 g |
| Processing aid (K 120 ND***) | 1.2 g | 1.2 g | 1.2 g | 1.2 g | 1.2 g | 1.2 g |
| Ca stearate | 0.3 g | 0.3 g | 0.3 g | 0.3 g | 0.3 g | 0.3 g |
| Zn stearate | 0.5 g | 0.5 g | 0.3 g | 0.3 g | 0.3 g | 0.3 g |
| Wax E**** | 0.2 g | 0.2 g | 0.2 g | 0.2 g | 0.2 g | 0.2 g |
| Polyvinyl alcohol (4/125*****) | 0.15 g | 0.15 g | 0.15 g | 0.15 g | 0.15 g | 0.15 g |
| Diisodecyl phenyl phosphite | 0.5 g | 0.5 g | 0.5 g | 0.5 g | 0.5 g | 0.5 g |
| $TiO_2$ | 4 g | 4 g | 4 g | 4 g | 4 g | 4 g |
| $CaCO_3$ | 4 g | 4 g | 4 g | 4 g | 4 g | 4 g |
| Hydrogenated caster oil | 1.3 g | 1.3 g | 1.3 g | 1.3 g | 1.3 g | 1.3 g |
| Organotin β-diketonate (******) | 0.5 g | 0.5 g | 0.5 g | 0.5 g | 0.5 g | 0 |
| Epoxidized soybean oil | 0.75 g | 0.25 g | 0.75 g | 0.25 g | 0 | 1 |
| Dawsonite | 0.25 g | 0.75 g | 0.75 g | 0.75 g | 0.5 g | 0 |

*PVC prepared in suspension: viscosity number = 91
K-value = 60
**methacrylate/butadiene/styrene copolymer
***high molecular mass (>1,000,000) polyacrylic resin
****lubricant based on colophony ester
*****polyvinyl alcohol: ester number = 125 viscosity in 4% solution in water = 4 mPa.s
******formula (II)

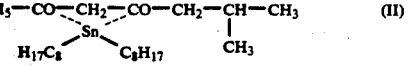

(II)

However, to avoid a decrease in the viscosity number of the chlorinated polymer, as little as possible of such oils is generally used, depending on the use envisaged for the compositions.

Usually, when present, the epoxides are present in the amount of from 0.05% to 5% by weight relative to the weight of the chlorinated polymer, and more specifically from 0.1% to 2% by weight.

The compositions of the present invention are generally of rigid formulation, i.e., without a plasticizer, or semirigid formulation, i.e., with reduced plasticizer contents, such as for applications in building or for the manufacture of bottles. However, the compositions according to the present invention can also be used in VICAT softening point Standards NF F 51-021, ISO 306, ASTM D 1525-76

From the homogeneous mixtures prepared as described above, samples approximately 4 mm thick were prepared by means of blending on a roller mixer at a temperature of 180° C. for 5 min, and then by means of a press at 185° C. (2 min in contact, 2 min at 2.1 MPa). VICAT conditions:
fluid: silicone
weight: 1 kg
rate of temperature rise: 50° C./h The following VICAT softening points were obtained:
composition A: 80.5° C.
composition B: 81.9° C.
composition C: 81.1° C.
composition D: 81.8° C.
composition E: 81° C.
composition E': 80.6° C.

Thermal stability

The thermal stability (time before blackening of the sample) was determined at 180° C. for each of the compositions, on the 4 mm samples prepared above.

The following results are obtained:
composition A: 42 min
composition B: 50 min
composition C: 61 min
composition D: 55 min
composition E: 36 min
composition E': 30 min

EXAMPLE 2

The formulations F, G, H and J detailed in Table II below were prepared in the same manner as Example 1 (the meanings of the terms defining the compounds are those which have been given for Table I).

The tests of measurement of the VICAT softening point and of thermal stability were performed as described in Example 1.

TABLE II

| COMPOUND | Composition F | Composition G | Composition H | Composition J |
|---|---|---|---|---|
| PVC suspension SO 91 | 100 g | 100 g | 100 g | 100 g |
| Impact strength enhancing agent KM 334 | 7 g | 7 g | 7 g | 7 g |
| Processing aid K 120 ND | 1.2 g | 1.2 g | 1.2 g | 1.2 g |
| Ca stearate | 0.3 g | 0.3 g | 0.3 g | 0.3 g |
| Zn stearate | 0.4 g | 0.4 g | 0.4 g | 0.2 g |
| Wax E | 0.2 g | 0.2 g | 0.2 g | 0.2 g |
| Polyvinyl alcohol | 0.15 g | 0.15 g | 0.15 g | 0.15 g |
| Diisodecyl phenyl phosphite | 0.5 g | 0.5 g | 0.5 g | 0.5 g |
| $TiO_2$ | 4 g | 4 g | 4 g | 4 g |
| $CaCO_3$ | 4 g | 4 g | 4 g | 4 g |
| Hydrogenated castor oil | 1.3 g | 1.3 g | 1.3 g | 1.3 g |
| Organotin β-diketonate of formula (II) | 1 g | 1 g | 1 g | 1 g |
| Epoxidized soybean oil | 0.5 g | 0 g | 0.5 g | 0.5 g |
| Dawsonite | 0.5 g | 0.5 g | 1 g | 0.5 g |
| VICAT softening point | 80.4° C. | 81° C. | 81° C. | 80.4° C. |
| Thermal Stability | 55 min | 55 min | 83 min | 69 min |

EXAMPLE 3

The formulations K, L, M and N detailed in Table III below were prepared in the same manner as Example 1 (the meanings of the terms defining the compounds are those which have been given for Table I).

The tests of measurement of the VICAT softening point and of thermal stability were performed as described in Example 1.

TABLE III

| COMPOUND | Composition K | Composition L | Composition M | Composition N |
|---|---|---|---|---|
| PVC suspension SO 91 | 100 g | 100 g | 100 g | 100 g |
| Impact strength enhancing agent KM 334 | 7 g | 7 g | 7 g | 7 g |
| Processing aid K 120 ND | 1.2 g | 1.2 g | 1.2 g | 1.2 g |
| Ca stearate | 0.3 g | 0.3 g | 0.3 g | 0.3 g |
| Zn stearate | 0.5 g | 0.3 g | 0.3 g | 0.4 g |
| Wax E | 0.2 g | 0.2 g | 0.2 g | 0.2 g |
| Polyvinyl alcohol | 0.15 g | 0.15 g | 0.15 g | 0.15 g |
| Diisodecyl phenyl phosphite | 0.5 g | 0.5 g | 0.5 g | 0.5 g |
| $TiO_2$ | 4 g | 4 g | 4 g | 4 g |
| $CaCO_3$ | 4 g | 4 g | 4 g | 4 g |
| Hydrogenated castor oil | 1.3 g | 1.3 g | 1.3 g | 1.3 g |
| Organotin β-diketonate of formula (II) | 1.5 g | 1.5 g | 1.5 g | 2 g |
| Epoxidized soybean oil | 0.25 g | 0.75 g | 0.25 g | 0.5 g |
| Dawsonite | 0.75 g | 0.75 g | 0.75 g | 0.5 g |
| VICAT softening point | 81.5° C. | 81° C. | 80.9° C. | 80° C. |
| Thermal Stability | 68 min | 82 min | 72 min | 76 min |

As can be gathered from these three examples, the lowering of the content of epoxidized soybean oil is possible without any detrimental effect on the thermal stability of the polymer. In fact, using the compositions of the present invention unexpectedly improves the thermal stability of the polymer composition. The same is true for the VICAT softening point of these polymers using compositions of the present invention.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition for stabilizing a chlorinated polymer, copolymer or homopolymer comprising:
    a) dawsonite,
    b) an organotin β-diketonate,
    c) an organic zinc compound, and
    d) an organic calcium, magnesium, barium or lanthanide compound or a mixture thereof.

2. The composition of claim 1, wherein said chlorinated polymer or copolymer is selected from the group consisting of polyvinyl chloride, polyvinylidene chloride, copolymers predominantly containing vinyl chloride units obtained from vinyl chloride and other monomers, and mixtures of polymers or copolymers of which a predominant part is obtained from vinyl chloride.

3. The composition of claim 1, wherein said organotin β-diketonate is a diorganotin derivative of an aromatic, arylaliphatic, aliphatic or cyclic β-diketone, a poly(β-diketone) or a β-keto aldehyde.

4. The composition of claim 1, wherein said organotin β-diketonate is a dialkyltin IV β-diketonate, or a 2 alkyl radical compound, wherein said alkyl radical may be identical or different from each other, being linear or branched and having from 1 to 12 carbon atoms.

5. The composition of claim 4, wherein said dialkyltin IV β-diketonate is selected from the group consisting of dimethyltin IV derivatives, dibutyltin IV derivatives, and dioctyltin IV derivatives of benzoylstearoylmethane, dibenzoylmethane, benzoylacetone, benzoyl-(3- methylbutanoyl)methane, (methoxycarbonylbenzoyl)-benzoylmethane and bis($\beta$-diketone).

6. The composition of claim 1, wherein said organotin $\beta$-diketonate is present in the amount of 0.005% to 5% by weight of organotin $\beta$-diketonate, relative to the weight of said chlorinated polymer, copolymer or homopolymer used.

7. The composition of claim 1, wherein said organic zinc compound is a zinc carboxylate or zinc phenolate.

8. The composition of claim 1, wherein said organic calcium, magnesium, barium or lanthanide compound is of the carboxylate or phenolate form.

9. The composition of claim 1, wherein said organic zinc compound is present in the amount of from 0.005% to 1% by weight relative to said chlorinated polymer, copolymer or homopolymer used.

10. The composition of claim 1, wherein said organic calcium, magnesium, barium or lanthanide compound or mixture thereof is present in the amount of from 0.005% to 5% by weight relative to the weight of said chlorinated polymer, copolymer or homopolymer used.

11. The composition of claim 1, wherein said dawsonite is present in the amount of from 0.005% to 5% by weight of dawsonite relative to the weight of said chlorinated polymer, copolymer or homopolymer used.

12. The composition of claim 1, further comprising a ($\gamma$-hydroxyalkyl)polyorganosiloxane oil of general formula (I)

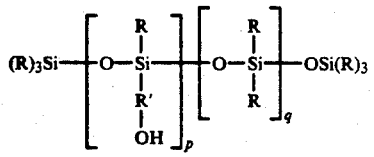

wherein:
R, which may be the same or different, represent a methyl or phenyl radical, with at least 60 mol % of R being methyl radicals;
R' represents a linear or branched alkylene radical having 2 to 6 carbon atoms;
p represents an average number from 1 to 30; and
q represents an average number from 1 to 100.

13. The composition of claim 12, wherein:
R represents a methyl radical;
R' represents a trimethylene or 2-methyl trimethylene radical;
p represents an average number from 2 to 20; and
q represents an average number from 2 to 30.

14. The composition of claim 12, wherein said ($\gamma$-hydroxyalkyl polyorganosiloxane oil is present in the amount of from 0.005% to 5% by weight relative to the weight of said chlorinated polymer, copolymer or homopolymer used.

15. A stabilized composition comprising:
a) a chlorinated polymer or copolymer,
b) dawsonite
c) an organotin $\beta$-diketonate,
d) an organic zinc compound, and
e) an organic calcium, magnesium, barium or lanthanide compound or a mixture thereof.

16. The stabilized composition of claim 15, wherein said chlorinated polymer or copolymer is selected from the group consisting of polyvinyl chloride, polyvinylidene chloride, copolymers predominantly containing vinyl chloride units obtained from vinyl chloride and other monomers, and mixtures of polymers or copolymers of which a predominant part is obtained from vinyl chloride.

17. The stabilized composition of claim 15, wherein said organotin $\beta$-diketonate is a diorganotin derivative of an aromatic, arylaliphatic, aliphatic or cyclic $\beta$-diketone, a poly($\beta$-diketone) or a $\beta$-keto aldehyde.

18. The stabilized composition of claim 15, wherein said organic zinc compound is a zinc carboxylate or zinc phenolate.

19. The stabilized composition of claim 15, wherein said organic calcium, magnesium, barium or lanthanide compound is of the carboxylate or phenolate form.

20. The stabilized composition of claim 15, further comprising a ($\gamma$-hydroxyalkyl)polyorganosiloxane oil of general formula (I)

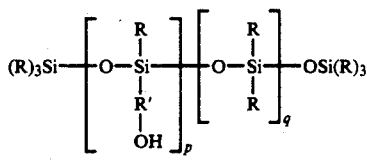

wherein:
R, which may be the same or different, represent a methyl or phenyl radical, with at least 60 mol % of R being methyl radicals;
R' represents a linear or branched alkylene radical having 2 to 6 carbon atoms;
p represents an average number from 1 to 30; and
q represents an average number from 1 to 100.

* * * * *